US012283216B2

(12) United States Patent
Zhou et al.

(10) Patent No.: US 12,283,216 B2
(45) Date of Patent: Apr. 22, 2025

(54) DRIVING CIRCUIT, DRIVING METHOD, AND DISPLAY DEVICE

(71) Applicant: HKC CORPORATION LIMITED, Shenzhen (CN)

(72) Inventors: Mancheng Zhou, Chongqing (CN); Rongrong Li, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 30 days.

(21) Appl. No.: 18/223,027

(22) Filed: Jul. 18, 2023

(65) Prior Publication Data

US 2024/0290242 A1 Aug. 29, 2024

(30) Foreign Application Priority Data

Feb. 28, 2023 (CN) ........................ 202310231477.X

(51) Int. Cl.
*G09G 3/20* (2006.01)
*G09G 3/32* (2016.01)

(52) U.S. Cl.
CPC ............. *G09G 3/2007* (2013.01); *G09G 3/32* (2013.01); *G09G 2300/0426* (2013.01); *G09G 2310/0243* (2013.01); *G09G 2320/0285* (2013.01)

(58) Field of Classification Search
CPC ................... G09G 3/2007; G09G 3/32; G09G 2300/0426; G09G 2310/0243; G09G 2320/0285
See application file for complete search history.

(56) References Cited

U.S. PATENT DOCUMENTS

| | | | | |
|---|---|---|---|---|
| 11,049,454 | B1 * | 6/2021 | Lu | G09G 3/3233 |
| 11,183,131 | B2 * | 11/2021 | Li | G09G 3/3688 |
| 11,481,068 | B1 * | 10/2022 | Shen | G06F 3/04166 |
| 11,514,863 | B1 * | 11/2022 | Lim | G09G 3/3266 |
| 11,527,217 | B2 * | 12/2022 | Chang | H01L 25/167 |

(Continued)

FOREIGN PATENT DOCUMENTS

| | | |
|---|---|---|
| CN | 104282277 A | 1/2015 |
| CN | 111564242 A | 8/2020 |

(Continued)

OTHER PUBLICATIONS

Lv, Pei, the ISA written comments, Oct. 2023, CN.
Lv, Pei, the International Search Report, Oct. 2023, CN.

*Primary Examiner* — William Lu

(57) ABSTRACT

A driving method of a display device and a display device are disclosed. The display device includes multiple scan lines, multiple data lines, and multiple LED lights driven by the multiple scan lines and data lines. The multiple LED lights are arranged in multiple rows and columns. An anode of each LED is connected to the respective scan line. A cathode of each LED is connected to the respective data line. The driving method includes: obtaining a compensated display grayscale corresponding to an LED in an instant row based on a display grayscale of an LED in the previous row, a display grayscale of the LED in the instant row, and a display grayscale compensation table; obtaining corresponding driving parameters according to the compensated display grayscale corresponding to the LED in the instant row; and controlling the LED in the instant row to display according to the driving parameters.

11 Claims, 6 Drawing Sheets

(56) References Cited

U.S. PATENT DOCUMENTS

| | | | | |
|---|---|---|---|---|
| 11,854,480 | B2 * | 12/2023 | Yu | G09G 3/3233 |
| 11,955,055 | B1 * | 4/2024 | Huang | G09G 3/32 |
| 12,027,093 | B2 * | 7/2024 | Chu | G06F 3/1446 |
| 12,062,318 | B2 * | 8/2024 | Meng | G09G 3/2096 |
| 2011/0242148 | A1 * | 10/2011 | Ina | G09G 3/3648 345/88 |
| 2013/0135272 | A1 * | 5/2013 | Park | G09G 3/3233 345/211 |
| 2013/0337596 | A1 * | 12/2013 | Hung | H10K 71/00 438/34 |
| 2015/0048835 | A1 * | 2/2015 | Lee | G09G 3/3208 324/414 |
| 2015/0235599 | A1 * | 8/2015 | Cho | H01L 27/1222 345/206 |
| 2015/0255030 | A1 * | 9/2015 | Watsuda | G09G 3/3685 345/92 |
| 2015/0379909 | A1 * | 12/2015 | Yu | G09G 3/006 345/78 |
| 2017/0372677 | A1 * | 12/2017 | Chang | H01L 31/16 |
| 2018/0197453 | A1 | 7/2018 | Lee et al. | |
| 2018/0301072 | A1 * | 10/2018 | Chaji | G09G 3/3233 |
| 2019/0325798 | A1 * | 10/2019 | Chaji | G09G 3/006 |
| 2019/0385544 | A1 * | 12/2019 | Tan | G09G 3/3607 |
| 2020/0227006 | A1 * | 7/2020 | Yao | G09G 3/006 |
| 2021/0280133 | A1 * | 9/2021 | Cai | G09G 3/3258 |
| 2021/0398473 | A1 * | 12/2021 | Ahn | G09G 3/2092 |
| 2021/0407368 | A1 * | 12/2021 | Gao | G09G 3/3685 |
| 2022/0187976 | A1 * | 6/2022 | Ito | G06F 3/0418 |
| 2022/0350432 | A1 * | 11/2022 | Takahashi | H10K 59/1213 |
| 2023/0237967 | A1 * | 7/2023 | Byun | G09G 3/20 345/76 |

FOREIGN PATENT DOCUMENTS

| | | | |
|---|---|---|---|
| CN | 111862889 | A | 10/2020 |
| CN | 113223449 | A | 8/2021 |
| CN | 113643637 | A | 11/2021 |
| CN | 113889023 | A | 1/2022 |
| CN | 115472131 | A | 12/2022 |
| CN | 116129803 | A | 5/2023 |

* cited by examiner

Calculating a parasitic capacitance on the respective data line corresponding to the LED in the previous row based on the display grayscale of the LED in the previous row — S181

↓

Calculating a compensation value for the display grayscale of the LED in the instant row based on the parasitic capacitance obtained by the LED in the previous row, the display grayscale of the LED in the instant row, and corresponding driving threshold voltages of the red LED light, the green LED light, and the blue LED light in the instant row — S182

↓

Obtaining the compensated display grayscale corresponding to the LED in the instant row based on the compensation value, so as to generate the display grayscale compensation table — S183

FIG. 8

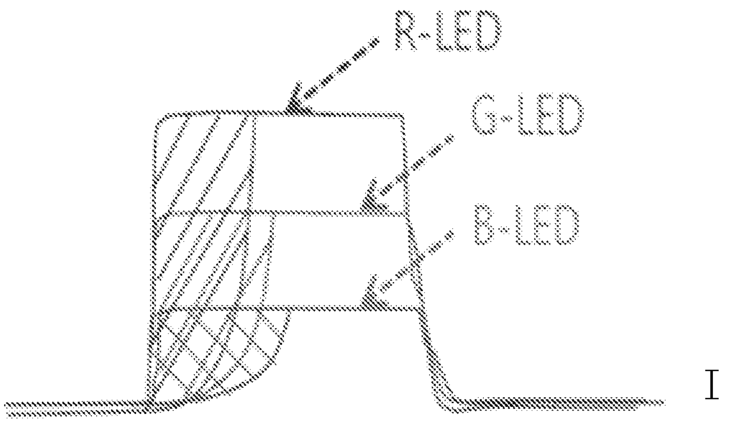

FIG. 9

DRIVING CIRCUIT, DRIVING METHOD, AND DISPLAY DEVICE

CROSS-REFERENCE TO RELATED APPLICATIONS

This application claims the priority and benefit of Chinese patent application number 202310231477X, titled "Driving Method of Display Device, and Display Device" and filed Feb. 28, 2023 with China National Intellectual Property Administration, the entire contents of which are incorporated herein by reference.

TECHNICAL FIELD

The present application relates to the field of display technology, and in particular, to a driving method of a display device and a display device.

BACKGROUND

The description provided in this section is intended for the mere purpose of providing background information related to the present application but doesn't necessarily constitute prior art.

With the improvement of the quality of life, LED display screens put forward higher requirements for row driving, from simple P-channel Metal-Oxide-Semiconductor Field-Effect Transistor (PMOSFET) that realizes row switching, to multi-functional row drivers with higher integration and stronger functions.

When the data signal of the control row is low, the voltage on the row line (that is, the anode voltage of the LED light) will be pulled high, and the data of the column tube (which can be understood as the voltage on the cathode of the LED light) will be displayed. The low-level data signals with different widths will get different LED light brightnesses. However, due to the existence of parasitic capacitance, the current discharged by the parasitic capacitance remains unchanged during display, resulting in different proportions of the currents flowing through the LEDs to those entering the data driving chip, resulting in color shift.

SUMMARY

In view of the above, it is therefore one purpose of the present application to provide a driving method of a display device and a display device, which can solve the problem of color shift caused by parasitic capacitance by compensating the display grayscale of the instant row.

The present application discloses a driving method of a display device. The display device includes scan lines, data lines, and a plurality of LED lights driven by the scan lines and data lines. The plurality of LED lights are arranged in multiple rows and columns. An anode of each LED is connected to the respective scan line. A cathode of each LED is connected to the respective data line. The driving method includes:

- obtaining the compensated display grayscale corresponding to the LED in the instant row according to the display grayscale of the LED in the previous row, the display grayscale of the LED in the instant row and a display grayscale compensation table;
- obtaining the corresponding driving parameters according to the compensated display grayscale corresponding to the LED in the instant row; and

- controlling the display of the LED in the instant row through the driving parameters.

In some embodiments, the operation of obtaining the compensated display grayscale corresponding to the LED in the instant row according to the display grayscale of the LED in the previous row, the display grayscale of the LED in the instant row and the display grayscale compensation table includes:

- calculating the parasitic capacitance on the data line corresponding to the LED in the previous row according to the display grayscale of the LED in the previous row;
- calculating a compensation value for the display grayscale of the LED in the instant row according to the parasitic capacitance obtained by the LED in the previous row and the display grayscale of the LED in the instant row; and
- obtaining the compensated display grayscale corresponding to the LED in the instant row according to the compensation value, so as to generate the display grayscale compensation table.

In some embodiments, the display device includes an LED current generation circuit. Each data line is correspondingly connected to an LED current generation circuit. The LED current generation circuit includes a data register, a digital-to-analog converter and a control switch. A gate terminal of the control switch is connected to the data register through the digital-to-analog converter. A source of the control switch is connected to a reference low level. A drain of the control switch outputs the LED current. The operation of obtaining the corresponding driving parameters according to the compensated display grayscale corresponding to the LED in the instant row includes:

- obtaining the corresponding voltage data according to the compensated display grayscale corresponding to the LED in the previous row;
- storing the voltage data in the data register, before the LED in the instant row is displayed, the data register transmitting the stored voltage data to the digital-to-analog converter to generate a corresponding data voltage, and controlling the turn-on of the control switch through the generated data voltage to generate the LED current.

In some embodiments, the operation of obtaining the compensated display grayscale corresponding to the LED in the instant row according to the display grayscale of the LED in the previous row, the display grayscale of the LED in the instant row, and the display grayscale compensation table includes:

- obtaining the compensated display grayscale corresponding to the LED in the instant row according to the original display grayscale of the LED in the previous row, the original a display grayscale of the LED in the instant row and the display grayscale compensation table.

In some embodiments, the operation of obtaining the compensated display grayscale corresponding to the LED in the instant row according to the display grayscale of the LED in the previous row and the display grayscale of the LED in the instant row and the display grayscale compensation table includes:

- calculating the parasitic capacitance on the data line corresponding to the LED in the second previous row according to the display grayscale of the LED in the second previous row;
- calculating a compensation value for the display grayscale of the LED in the second previous row according to the parasitic capacitance obtained by the LED in the second previous row and the display grayscale of the LED in the second previous row to drive the display of the LED in the second previous row;

calculating a compensation value for the display grayscale of the LED in the instant row according to the parasitic capacitance obtained by the compensated LED in the previous row and the display grayscale of the LED in the instant row;

obtaining the compensated display grayscale corresponding to the LED in the instant row according to the compensation value for the display grayscale of the LED in the previous row and the compensation value for the display grayscale of the LED in the instant row, so as to generate the display grayscale compensation table.

In some embodiments, the LED lights include a red LED light, a green LED light, and a blue LED light, and the operation of obtaining the compensated display grayscale corresponding to the LED in the instant row according to the display grayscale of the LED in the previous row, the display grayscale of the LED in the instant row, and the display grayscale compensation table includes:

calculating the parasitic capacitance on the data line corresponding to the LED in the previous row according to the display grayscale of the LED in the previous row;

calculating the compensation value for the display grayscale of the LED in the instant row according to the parasitic capacitance obtained by the LED in the previous row, the display grayscale of the LED in the instant row, and the corresponding driving threshold voltages of the red LED light, the green LED light, and the blue LED light in the LED light in the instant row; and obtaining the compensated display grayscale corresponding to the LED in the instant row according to the compensation value, so as to generate the display grayscale compensation table;

where a display grayscale lookup table is provided corresponding to each row of LEDs.

In some embodiments, the display device includes a data driving chip. The data driving chip outputs driving parameters to the data line. The operation of obtaining the compensated display grayscale corresponding to the LED in the instant row according to the display grayscale of the LED in the previous row, the display grayscale of the LED in the instant row and the display grayscale compensation table includes:

dividing the display device into a first display region and a second display region along the data line direction; and When the LED light in the previous row and the LED light in the instant row are located in the first display region, obtaining the compensated display grayscale corresponding to the LED in the instant row according to the display grayscale of the LED in the previous row, the display grayscale of the LED in the instant row and a first display grayscale compensation table; when the LED light in the previous row and the LED light in the instant row are located in the second display region, obtaining the compensated display grayscale corresponding to the LED in the instant row according to the display grayscale of the LED in the previous row, the display grayscale of the LED in the instant row, and a second display grayscale compensation table; when the LED light in the previous row is located in the first display region and the LED light in the instant row is located in the second display region, obtaining the compensated display grayscale corresponding to the LED in the instant row according to the compensated display grayscale of the LED in the previous row, the display grayscale of the LED in the instant row, and the second display grayscale compensation table;

wherein when the display grayscale of the LED in the previous row and the display grayscale of the LED in the instant row in the first display region are the same as the display grayscale of the LED in the previous row and the display grayscale of the LED in the instant row in the second display region, the compensated display grayscale corresponding to the first display grayscale compensation table and the second display grayscale compensation table are different.

In some embodiments, the parasitic capacitance is C1, the parasitic capacitance between the data line and the ground wire is C2, the parasitic capacitance between the data line and the scan line is C3, and the parasitic capacitance in the LED light is C4, and C1=C2+C3+C4.

In some embodiments, the display grayscale is the display grayscale of the data line, and the driving method further includes:

when the LED light stops emitting light, no driving parameters are output on the data line, correspondingly reducing the voltage of the control terminal of the driving switch of the scan line to release the parasitic capacitance on the scan line.

The application further discloses a display device. The display device is driven by any of the driving methods described above. The display device includes scan lines, data lines, and a plurality of LED lights driven by the scan lines and data lines. The plurality of LED lights are arranged in multiple rows and columns. An anode of the LED is connected to the respective scan line. A cathode of the LED is connected to the respective data line. The display device further includes a storage module and a driving parameter generation module. The storage module is used to store the display grayscale compensation table. The driving parameter generation module generates corresponding driving parameters according to the compensated display grayscale corresponding to the LED in the instant row to control the display of the LED lights of the display device.

This application considers that parasitic capacitance will be generated after the display of the LED in the previous row, and the generated parasitic capacitance will affect the display of the next row of LEDs, and so the present application adjusts the display grayscale of the LED in view of the influence of the parasitic capacitance. In particular, the display grayscale of the LED light in the previous row and the display grayscale of the LED light in the instant row are obtained, and then the compensated display grayscale corresponding to the LED in the instant row is obtained through the stored display grayscale compensation table. Further, the corresponding driving parameters are obtained according to the compensated display grayscale corresponding to the LED in the instant row. Accordingly, the display of LEDs in the instant row is controlled through the driving parameters. Because the driving parameters obtained by the display grayscale compensation table already include the influence of parasitic capacitance on the image, the color shift problem has been improved and resolved when LED is displayed.

BRIEF DESCRIPTION OF DRAWINGS

The accompanying drawings are used to provide a further understanding of the embodiments according to the present application, and constitute a part of the specification. They are used to illustrate the embodiments according to the present application, and explain the principle of the present application in conjunction with the text description. Apparently, the drawings in the following description merely represent some embodiments of the present disclosure, and for those having ordinary skill in the art, other drawings may also be obtained based on these drawings without investing creative efforts. A brief description of the accompanying drawings is provided as follows.

FIG. 8 is a schematic flow chart of a driving method according to a fourth embodiment of the present application.

FIG. 9 is a schematic diagram of a RGB current waveform according to the fourth embodiment of the present application.

Figure 1:
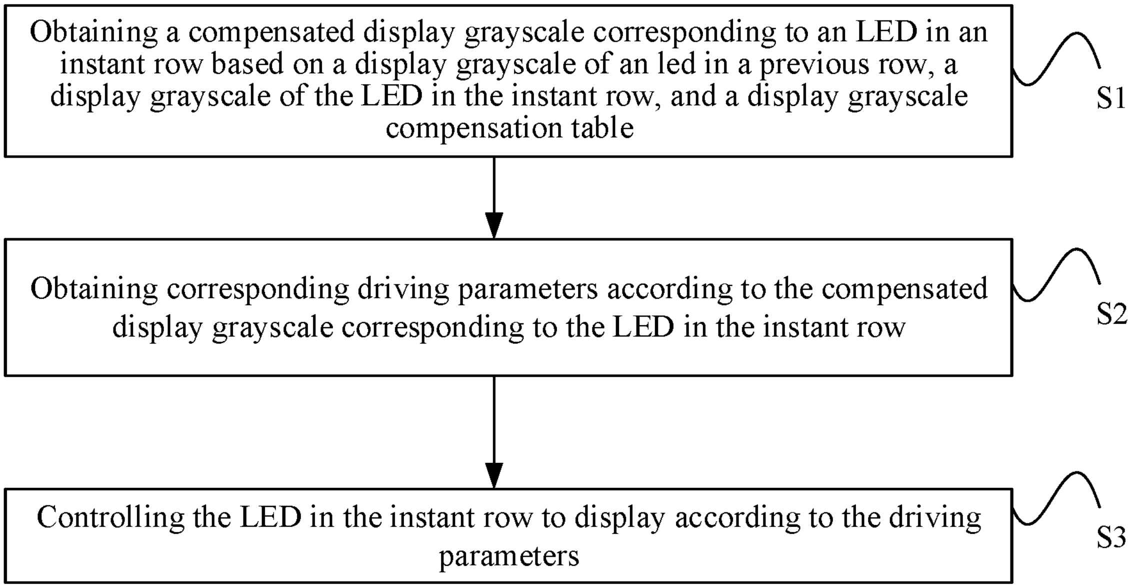
FIG. 1 is a schematic flow chart of a driving method according to a first embodiment of the present application.

In the drawings: 100, display device; 110, scan line; 120, data line; 130, LED light; 140, storage module; 150, driving parameter generation module; 151, LED current generation circuit; 152, data register; 153, digital-analog converter; 154, control switch; 160, driving switch.

DETAILED DESCRIPTION OF EMBODIMENTS

It should be understood that the terms used herein, the specific structures and function details disclosed herein are intended for the mere purposes of describing specific embodiments and are representative. However, this application may be implemented in many alternative forms and should not be construed as being limited to the embodiments set forth herein.

As used herein, terms "first", "second", or the like are merely used for illustrative purposes, and shall not be construed as indicating relative importance or implicitly indicating the number of technical features specified. Thus, unless otherwise specified, the features defined by "first" and "second" may explicitly or implicitly include one or more of such features. Terms "multiple", "a plurality of", and the like mean two or more. Term "comprising", "including", and any variants thereof mean non-exclusive inclusion, so that one or more other features, integers, steps, operations, units, components, and/or combinations thereof may be present or added.

In addition, terms "center", "transverse", "up", "down", "left", "right", "vertical", "horizontal", "top", "bottom", "inside", "outside", or the like are used to indicate orientational or relative positional relationships based on those illustrated in the drawings. They are merely intended for simplifying the description of the present disclosure, rather than indicating or implying that the device or element referred to must have a particular orientation or be constructed and operate in a particular orientation. Therefore, these terms are not to be construed as restricting the present disclosure.

Furthermore, as used herein, terms "installed on", "mounted on", "connected to", "coupled to", "connected with", and "coupled with" should be understood in a broad sense unless otherwise specified and defined. For example, they may indicate a fixed connection, a detachable connection, or an integral connection. They may denote a mechanical connection, or an electrical connection. They may denote a direct connection, a connection through an intermediate, or an internal connection between two elements. For those of ordinary skill in the art, the specific meanings of the above terms as used in the present application can be understood depending on specific contexts.

Hereinafter this application will be described in further detail with reference to the accompanying drawings and some optional embodiments.

As shown in FIG. 1, as a first embodiment of the present application, a driving method of a display device 100 is disclosed. The display device 100 mainly uses mini-LED, and this application mainly describes how to solve the problem of color shift in mini-LED caused by parasitic capacitance. Specifically, the display device 100 includes scan lines 110, data lines 120, and a plurality of LED lights 130 driven by the scan lines 110 and the data lines 120. The plurality of LED lights 130 are arranged in multiple rows and multiple columns. The anode of each LED is connected to the respective scan line 110. The cathode of the LED is connected to the respective data line 120. The driving method comprises the following operations:

- S1: obtaining the compensated display grayscale corresponding to the LED in the instant row according to the display grayscale of the LED in the previous row, the display grayscale of the LED in the instant row and the display grayscale compensation table;
- S2: obtaining corresponding driving parameters according to the compensated display grayscale corresponding to the LED in the instant row; and
- S3: controlling the display of the LED in the instant row through the driving parameters.

After the display of the LED in the previous row ends, the corresponding parasitic capacitances are also charged. Due to the existence of parasitic capacitance, when the instant row is displayed, the current discharged by the parasitic capacitance remains unchanged, resulting in a different proportion of the current flowing through the LED and entering the driving parameter generation module 150 (also called MBI LED-Driver IC, LED data driving chip), resulting in color shift. This phenomenon is more severe especially for low grayscales, because the proportion of the current on the parasitic capacitance entering the Driver IC becomes larger, and so the phenomenon is naturally more obvious. This application obtains the compensated display grayscale corresponding to the LED in the instant row based on the display grayscale of the LED in the previous row 130, the display grayscale of the LED in the instant row 130 and the display grayscale compensation table, and so the driving parameters corresponding to the compensated display grayscale have actually taken into account the problem of parasitic capacitance. When the driving parameters corresponding to the compensated display grayscale are used to drive the LED lights 130 for display, the problem of color shift is improved and resolved.

Figure 2:
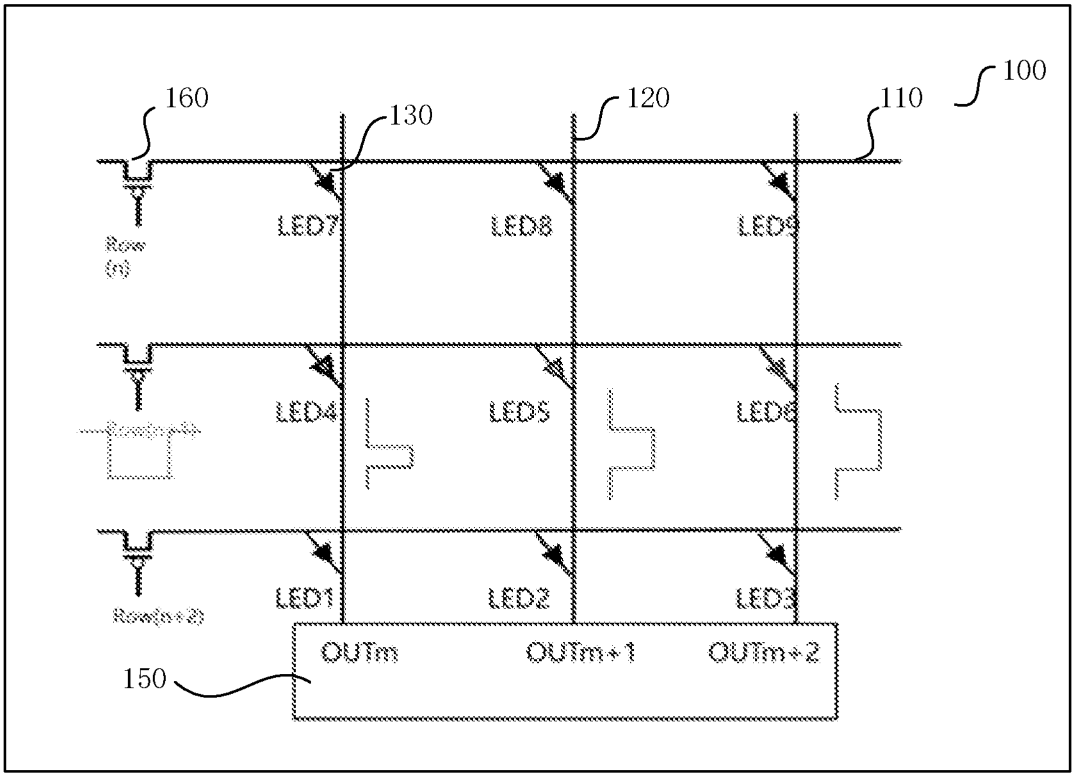
FIG. 2 is a schematic diagram of a display device according to the first embodiment of the present application.
Figure 3:
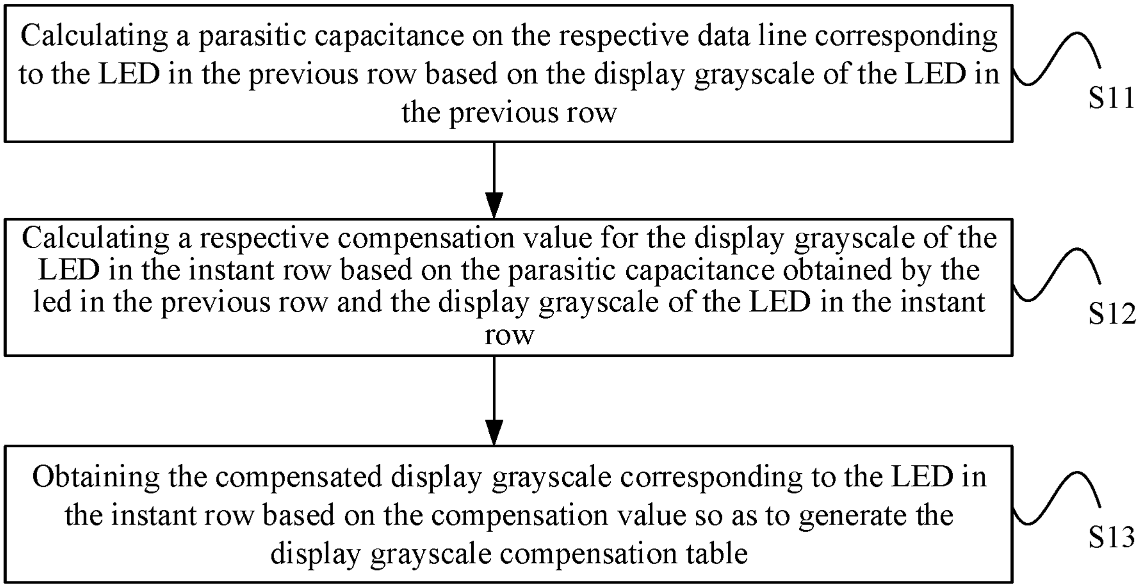
FIG. 3 is a schematic flow chart of a display grayscale compensation table in the first embodiment of the present application.

Further, it should be noted that in the generation of the display grayscale compensation table, specifically, as shown in FIG. 2, S1 includes:

S11: calculating the parasitic capacitance corresponding to the LED in the previous row according to the display grayscale of the LED in the previous row;

S12: calculating a compensation value for the display grayscale of the LED in the instant row according to the parasitic capacitance obtained by the LED in the previous row and the display grayscale of the LED in the instant row; and S13: obtaining the compensated display grayscale corresponding to the LED in the instant row according to the compensation value, so as to generate the display grayscale compensation table.

The above operations can also be understood as the generation operations of the display grayscale compensation table. The display grayscale compensation table calculates the compensation value for the LED display grayscales of the instant row based on the display grayscale of the LED in the previous row, the corresponding parasitic capacitance and the display grayscales of the instant row. The display grayscale compensation table is as shown in Table 1 below:

TABLE 1

| | Previous line | | | | |
|---|---|---|---|---|---|
| Instant row | Gray0 | Gray1 | Gray2 | . . . | Gray63 |
| Gray0' | V00 | V10 | V20 | | . |
| Gray1' | V01 | V11 | V21 | | . |
| Gray2' | V02 | V12 | V22 | | . |
| Gray3' | V03 | V13 | V23 | | |
| . | | . | | | |
| . | | . | | | |
| . | | . | | | |
| Gray63' | | | | | |

In the above table 1, there is shown the data voltages (64 grayscales, corresponding to 6 bits of data) that need to be output corresponding to the grayscales of the previous row and the grayscales of the instant row. Gray(n) indicates the grayscale displayed by LED in the same column of the previous row, and Gray(m)' is the grayscale to be displayed in the same column of the instant row. Before the mass production of the product, the most suitable table will be debugged according to the display needs of the form. The table will be adjusted based on the display requirements to obtain the most suitable table. For example, if the grayscale displayed in the previous row is Gray2', and the grayscale displayed in the instant row is Gray0, then the display grayscale of the instant row after compensation is the grayscale of V02 in the table. Because the display grayscale V02 already includes the influence of parasitic capacitance on the image, the problem of color shift is solved.

In operation S1, the compensated display grayscale corresponding to the LED in the instant row may be obtained based on the original display grayscale of the LED in the previous row 130, the original a display grayscale of the LED in the instant row 130 and the display grayscale compensation table, or the compensated display grayscale corresponding to the LED in the instant row may be obtained based on the compensated display grayscale of the LED in the previous row 130, the original a display grayscale of the LED in the instant row 130 and the display grayscale compensation table.

In addition, if the total amount of parasitic capacitance contributing to the effect is C1, the parasitic capacitance between the data line 120 and the ground wire is C2, the parasitic capacitance between the data line 120 and the scan line 110 is C3, and the parasitic capacitance in the LED light 130 is C4, then C1=C2+C3+C4. This application considers all parasitic capacitances, and through the calculation of all parasitic capacitances, the color shift problem caused by all parasitic capacitances is avoided. The compensated display grayscale obtained in the display grayscale compensation table thus formed can completely eliminate the influence of parasitic capacitance.

In addition, when the LED light 130 stops emitting light, no driving parameter is output on the data line 120, then the control terminal voltage of the driving switch 160 of the scan line 110 can be correspondingly reduced to release the parasitic capacitance on the scan line 110. By reducing the control terminal voltage of the driving switch 160, thereby increasing the conduction degree of the driving switch 160, the parasitic capacitance generated by the scan line 110 can be released faster. In addition, when the LED is displayed, the conduction degree of the driving switch 160 can also be changed, thereby changing the voltage at the anode terminal of the LED, thereby changing the magnitude of the current on the LED, and further changing the proportion of the current produced by the parasitic capacitance. That is, a display grayscale compensation table can also be generated corresponding to the scan line 110 and used together with the display grayscale compensation table corresponding to the data line 120, so as to change the influence of the parasitic capacitance on the data line 120 and the scan line 110.

Figure 4:
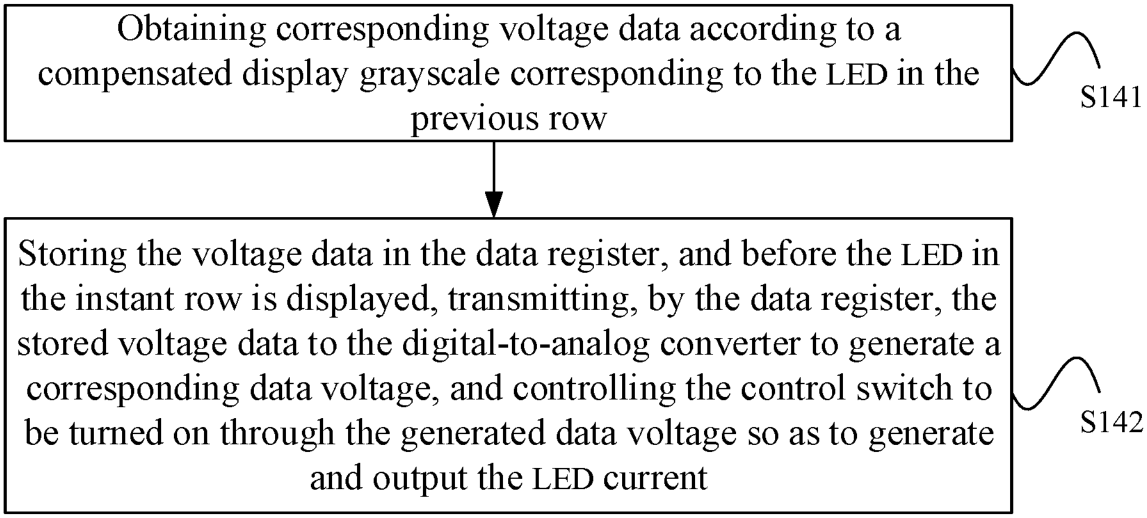
FIG. 4 is a schematic flow chart of a driving method according to a second embodiment of the present application.
Figure 5:
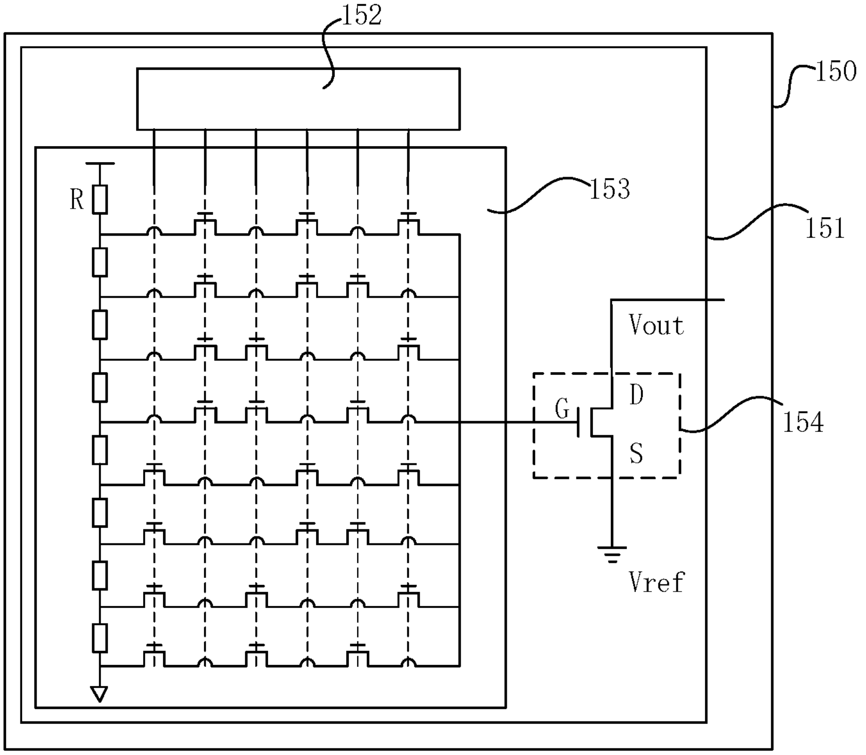
FIG. 5 is a schematic diagram of a driving parameter generation module according to the second embodiment of the present application.

As shown in FIG. 4, as a second embodiment of the present application, a driving method is disclosed, which is a further limitation based on the driving method in the first embodiment. Referring to FIG. 4 to FIG. 5, the display device 100 includes an LED current generation circuit 151. Each data line 120 is correspondingly connected to an LED current generation circuit 151. The LED current generation circuit 151 includes a data register 152, a digital-to-analog converter 153 and a control switch 154. A gate terminal of the control switch 154 is connected to the data register 152 through the digital-to-analog converter 153. A source terminal of the control switch 154 is connected to a reference low level. Operation S1 includes:

S141: obtaining corresponding voltage data according to the compensated display grayscale corresponding to the LED in the previous row; and S142: storing the voltage data in the data register, before the display of the LED in the instant row, the data register 152 transmitting the stored voltage data to the digital-to-analog converter to generate the corresponding data voltage, so as to the turn-on of the control switch through the generated data voltage to generate and output an LED current.

Considering that the current is the main factor affecting the display of the LED light 130, the corresponding voltage data is obtained according to the compensated display grayscale corresponding to the LED in the preceding row. Before the LED light 130 is displayed, the data register 152 transmits the stored voltage data to the digital-to-analog converter 153 to generate a corresponding data voltage, and the generated data voltage is used to control the turn-on of the control switch 154 to generate and output the LED current. During the turn-on period of one scan signal, a current signal is output according to the output parameters of the current signal to drive the LED that needs to be lit at present, so that the LED light 130 lights up and displays. The conduction degree of the control switch 154 is controlled by controlling the voltage value of the control terminal of the switch 154, thereby controlling the magnitude of the driving current of the LED, adjusting the ratios of the discharge current of the parasitic capacitor to the current flowing through the LED and to that entering the Driver IC.

Specifically, take one row of LEDs in the display device 100 as an example, because the charges on the parasitic capacitance has a strong correlation with the display of the previous row. For example, in FIG. 2, if the brightness of LED6 in column OUTm+2 is Gray255, and the LED5 in column OUTm+1 is Gray0, then after the instant row is turned off, the charges of the parasitic capacitance on the column OUTm+2 would be more than those on the column OUTm+1, because the parasitic capacitance on OUTm+2 is charged more. In view of this, if the current problem of LEDs in the present row can be compensated according to the situation in the previous row, the problem of color shift can be improved. In view of this, this application changes the resistor divider part in the original design into a digital-to-analog converter 153 (DAC unit), and adds a data register 152. Referring to FIG. 5, different gate G voltages are obtained based on different (6 bit) data. Referring to the above table 1, there is shown the data voltages (64 grayscales, corresponding to 6 bits of data) that need to be output corresponding to the grayscales of the previous line and the grayscales of the instant row. Take FIG. 2 where LED4 is about to display Gray2', and LED7 has just finished displaying Gray0 as an example. Before the mass production of the product, the above table 1 will be adjusted to obtain the most suitable table. The data register 152 assigns data to the DAC unit, and the output G of the DAC unit is V02 voltage. Because the V02 voltage already includes the influence of parasitic capacitance on the image, it can be seen that the color shift problem has been solved.

Figure 6:
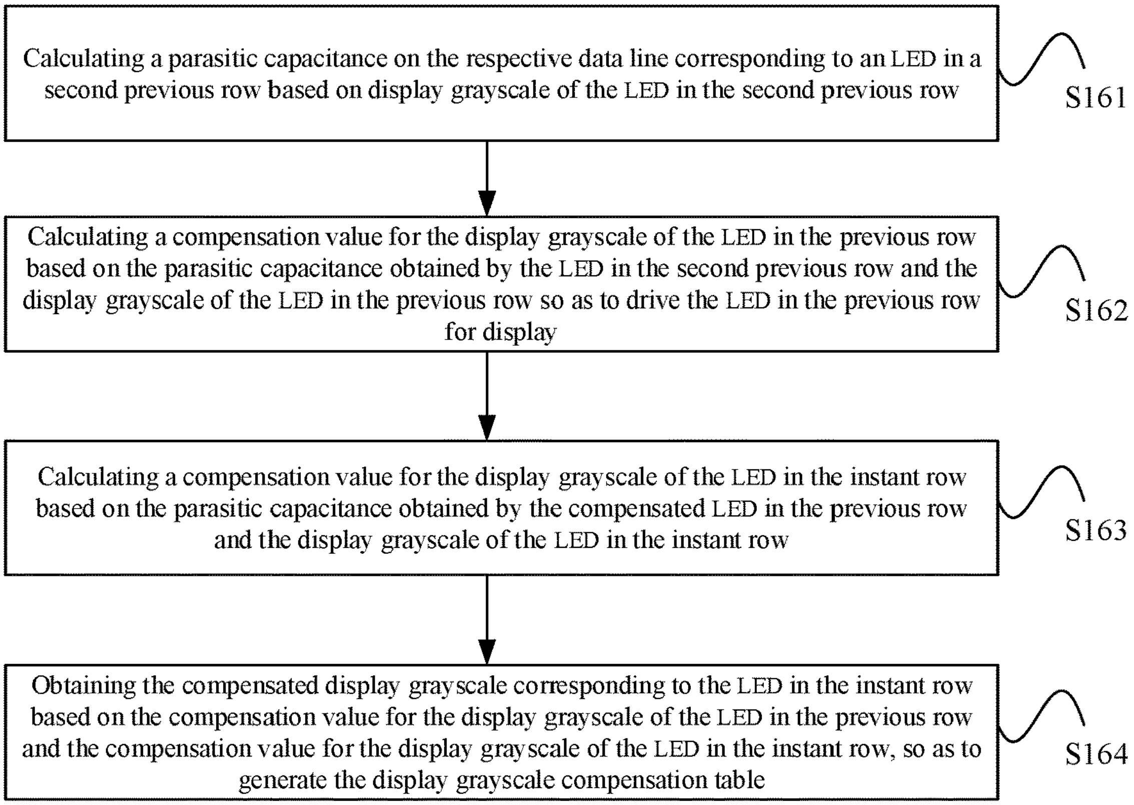
FIG. 6 is a schematic flow chart of a driving method according to a third embodiment of the present application.

As shown in FIG. 6, as a third embodiment of the present application, a driving method is disclosed. This driving method is also a refinement and improvement based on the driving method of the first embodiment, where the operation S1 includes:

- S161: calculating and obtaining the parasitic capacitance on the data line corresponding to the LED in the second previous row according to the display grayscale of the LED in the second previous row;
- S162: according to the parasitic capacitance obtained from the LED in the second previous row and the display grayscale of the LED in the second previous row, calculating the compensation value for the display grayscale of the LED in the previous row to drive the display of the LED in the previous row;
- S163: calculating and obtaining the compensation value for the LED display grayscales of the instant row according to the parasitic capacitance obtained by the compensated LED in the second previous row and the display grayscale of the LED in the instant row; and
- S164: obtaining the compensated display grayscale corresponding to the LED in the instant row according to the compensation value for the display grayscale of the LED in the previous row and the compensation value of the display grayscale of the LED in the instant row, so as to generate the display grayscale compensation table.

Figure 7:
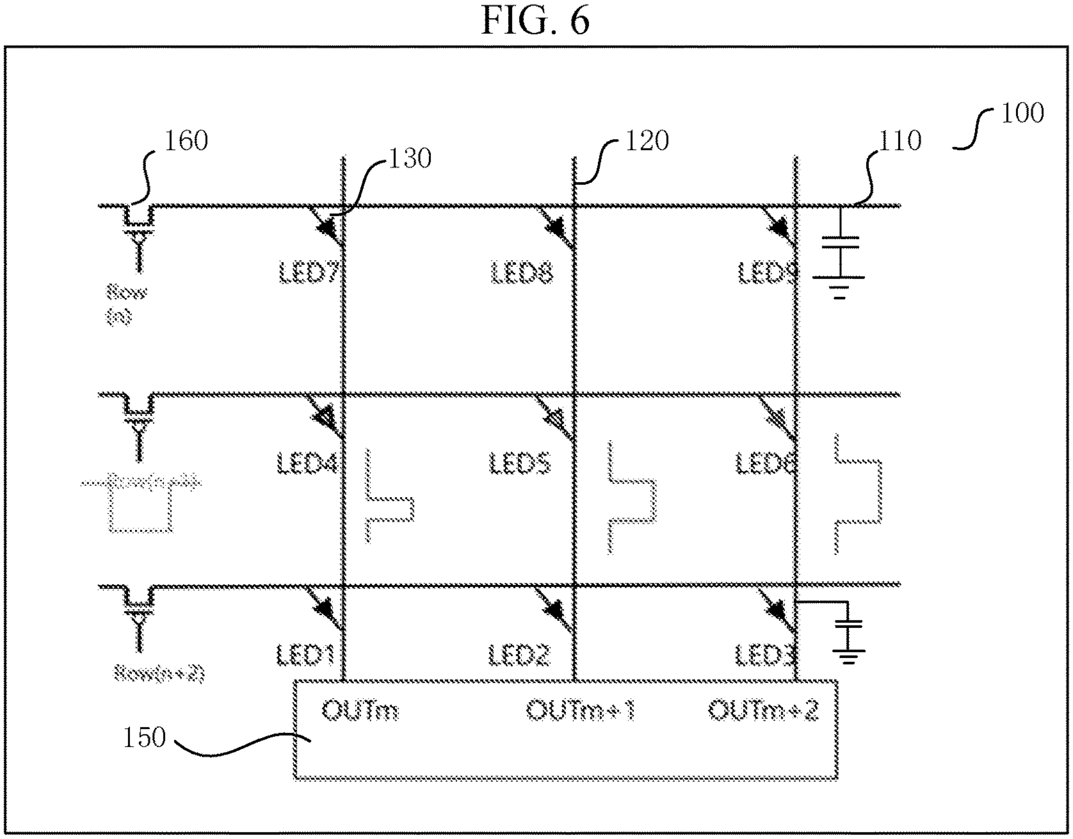
FIG. 7 is a schematic diagram of a display device according to the third embodiment of the present application.

Referring to FIGS. 6 and 7, considering that there will still be parasitic capacitance after each row of LED lights 130 is displayed, after the instant row is compensated, though the problem of color shift in LED display is improved, the compensated display grayscale only takes into account the display grayscale of the instant row and the display grayscale of the previous row, but there will still be parasitic capacitance in the LEDs of the second previous row, and the generated parasitic capacitance is very likely to affect the LED in the instant row when the LED in the instant row is displayed. Based on this, the compensation of the display grayscales of the instant row in this embodiment takes into account the parasitic capacitances of the previous two rows, so as to avoid being affected by the parasitic capacitances of the previous row and the second previous row. In particular, when the second previous row displays grayscale at 255, the previous row displays grayscale at 0, and the instant row displays grayscale at 255, then the impact of the second previous row on the compensation of the instant row is greater than the impact of the parasitic capacitance of the previous row on the LED display of the instant row.

Further, as shown in FIG. 8, as a fourth embodiment of the present application, it is a further limitation to any of the above-mentioned embodiments. The LED light 130 includes a red LED light 130, a green LED light 130 and a blue LED light 130. operation S1 includes:

- S181: calculating and obtaining the parasitic capacitance on the data line corresponding to the LED in the previous row according to the display grayscale of the LED in the previous row;
- S182: calculating and obtaining the compensation value for the LED display grayscales of the instant row according to the parasitic capacitance obtained from the LED in the previous row, the display grayscale of the LED in the instant row, and the corresponding driving threshold voltages of the red LED light, green LED light and blue LED light in the LED light in the instant row; and
- S183: obtaining the compensated display grayscale corresponding to the LED in the instant row according to the compensation value, so as to generate the display grayscale compensation table;

where a display grayscale lookup table is provided corresponding to each row of LEDs.

If the proportion of the current flowing through the red LED is small, the red LED light 130 is less affected by the parasitic capacitance, and the overall color is reddish. If the proportion of the current flowing through the blue LED is small, then the blue LED light 130 is less affected by the parasitic capacitance, and the overall color is bluish. If the proportion of the current flowing through the green LED is small, the green LED light 130 is less affected by the parasitic capacitance, and the overall color is greenish. In FIG. 9, it reflects the current magnitudes corresponding to RGB, where the shaded parts are the current ratios of parasitic capacitance in RGB LEDs. Since the thresholds of the driving switches 160 corresponding to the red LED, the blue LED and the green LED are different, the required input driving voltages are different, and the corresponding currents are also different. Therefore, a display grayscale compensation table is provided corresponding to each display row having RGB LED lights 130. The display grayscale compensation table takes into account the influence of parasitic capacitance, and also considers the problems caused by differences in LEDs of different colors.

Figure 10:
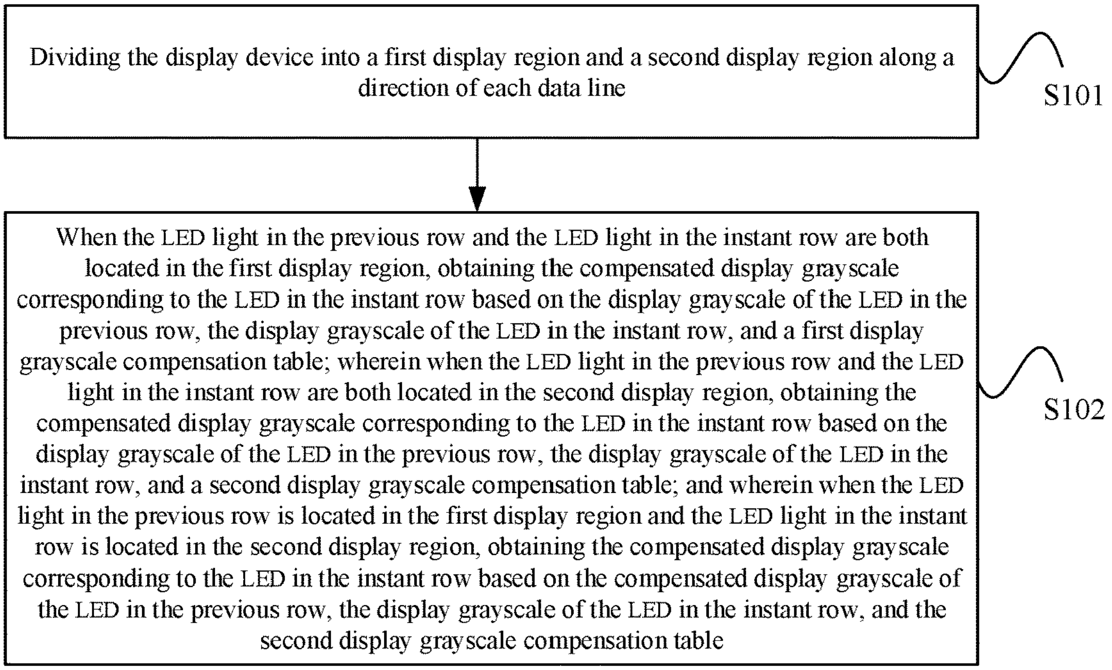
FIG. 10 is a schematic flow chart of a driving method according to a fifth embodiment of the present application.

As shown in FIG. 10, as a fifth embodiment of the present application, it is a limitation of the above-mentioned first embodiment. The display device 100 includes a data driving chip, and the data driving chip outputs driving parameters to the data line 120. The operation S1 includes:

S101: dividing the display device into a first display region and a second display region along the data line direction; and

S102: When the LED light in the previous row and the LED light in the instant row are located in the first display region, obtaining the compensated display grayscale corresponding to the LED in the instant row according to the display grayscale of the LED in the previous row, the display grayscale of the LED in the instant row and a first display grayscale compensation table; when the LED light in the previous row and the LED light in the instant row are located in the second display region, obtaining the compensated display grayscale corresponding to the LED in the instant row according to the display grayscale of the LED in the previous row, the display grayscale of the LED in the instant row, and a second display grayscale compensation table; when the LED light in the previous row is located in the first display region and the LED light in the instant row is located in the second display region, obtaining the compensated display grayscale corresponding to the LED in the instant row according to the compensated display grayscale of the LED in the previous row, the display grayscale of the LED in the instant row, and the second display grayscale compensation table;

The number of rows and the total number of LEDs in the first display region are the same as the number of rows and the total number of LED lights 130 in the second display region. When the display grayscale of the LED in the previous row 130 and the display grayscale of the LED in the instant row 130 in the first display region are the same as the display grayscale of the LED in the previous row 130 and the display grayscale of the LED in the instant row 130 in the second display region, the compensated display grayscale corresponding to the first display grayscale compensation table and the second display grayscale compensation table are different. When the LED light in the previous row is located in the first display region and the LED light in the instant row is located in the second display region, the compensated display grayscale corresponding to the LED in the instant row is obtained according to the compensated display grayscale of the LED in the previous row, the display grayscale of the LED in the instant row and the first display grayscale compensation table.

Considering the influence of wire resistance, the voltage signal or current on the data line will have a certain loss, so the compensation at the end far away from the signal output is different from the end close to the signal output, and so there are different display grayscale compensation tables in the first display region and the second display region. Of course, a display device 100 may not only be provided with two display regions, but may be provided with display regions according to the number of scan lines 110, where one row of scan lines 110 or two rows of scan lines 110 may be defined as a display region. Thus, different display grayscale compensation tables are set depending on the distances between the display region and the signal output end, so as to more accurately solve the color shift problem of each row of LED lights 130.

Figure 11:
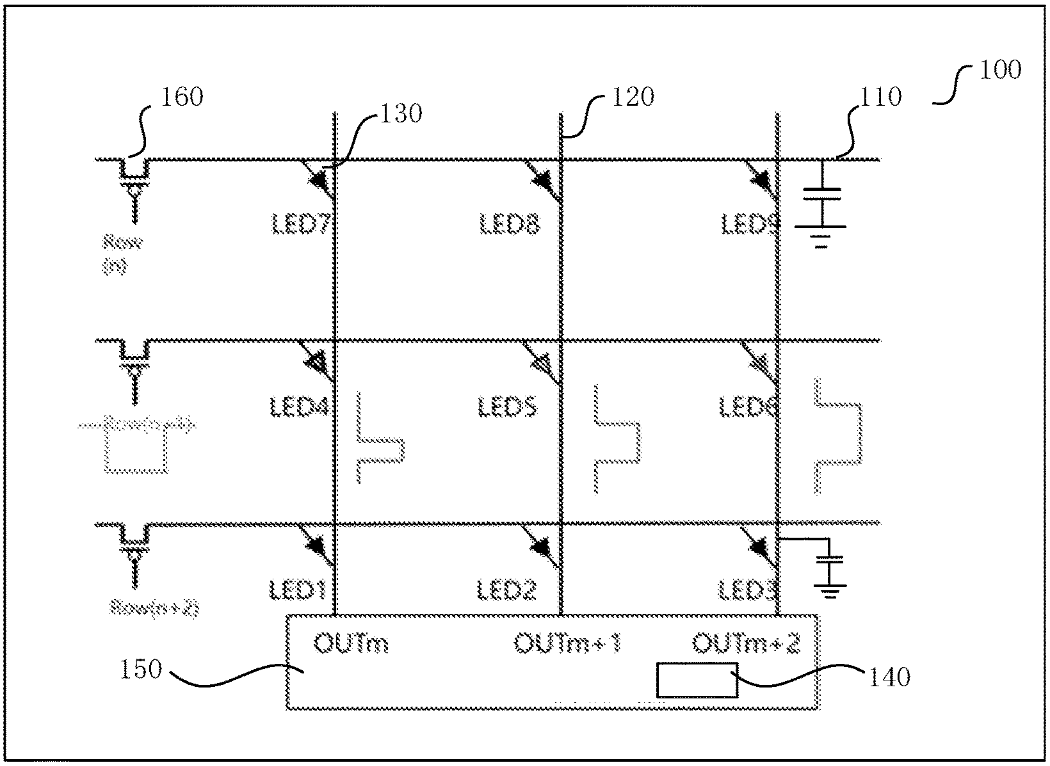
FIG. 11 is a schematic diagram of a display device according to a sixth embodiment of the present application.

As shown in FIG. 11, as a sixth embodiment of the present application, a display device 100 is disclosed, and the display device 100 is driven by using the driving method described in any of the above embodiments. The display device 100 includes scan lines 110, data lines 120, and a plurality of LED lights 130 driven by the scan lines 110 and the data lines 120. The plurality of LED lights 130 are arranged in multiple rows and multiple columns. The anode of the LED is connected to the respective scan line 110. The cathode of the LED is connected to the respective data line 120. The display device 100 further includes a storage module 140 and a driving parameter generation module 150. The storage module 140 is used for storing the display grayscale compensation table. The driving parameter generation module 150 generates corresponding driving parameters according to the compensated display grayscale corresponding to the LED in the instant row to control the display of the LED lights 130 of the display device 100.

According to the display grayscale of the LED in the previous row 130, the display grayscale of the LED in the instant row 130 and the display grayscale compensation table, the compensated display grayscale corresponding to the LED in the instant row are obtained. When the driving parameters corresponding to the compensated display grayscale are used to drive and display the LED lights 130, the driving parameters are actually changed relative to the driving parameters corresponding to the original display grayscales, and the parasitic capacitance is taken into consideration, so that the parasitic capacitance is taken into account and the current generated by the parasitic capacitance accounts for less current flowing into the input terminal of the driving parameter generation module 150, so as to avoid the current generated by the parasitic capacitance from affecting the current of the LED in the instant row after the LED in the previous row emits light thus resulting in a color shift problem.

It should be noted that the limitations of various operations involved in this solution will not be deemed to limit the order of the operations, provided that they do not affect the implementation of the specific solution, so that the operations written earlier may be executed earlier or they may also be executed later or even at the same time. As long as the solution can be implemented, they should all be regarded as falling in the scope of protection of this application.

It should be noted that the inventive concept of the present application can be formed into many embodiments, but the length of the application document is limited and so these embodiments cannot be enumerated one by one. The technical features can be arbitrarily combined to form a new embodiment, and the original technical effect may be enhanced after the various embodiments or technical features are combined.

The foregoing description is merely a further detailed description of the present application made with reference to some specific illustrative embodiments, and the specific implementations of the present application will not be construed to be limited to these illustrative embodiments. For those having ordinary skill in the technical field to which this application pertains, numerous simple deductions or substitutions may be made without departing from the concept of this application, and shall all be regarded as falling in the scope of protection of this application.

What is claimed is:

1. A driving method of a display device, the display device comprising a plurality of scan lines, a plurality of a data lines, and a plurality of LED lights driven by the plurality of scan lines and the plurality of data lines; wherein the plurality of LED lights are arranged in a plurality of rows and a plurality of columns; wherein an anode of each LED is connected to the respective scan line, and a cathode of each LED is connected to the respective data line; wherein the driving method comprises:

obtaining a compensated display grayscale corresponding to an LED in an instant row based on a display grayscale of an LED in a previous row, a display grayscale of the LED in the instant row, and a display grayscale compensation table;

obtaining corresponding driving parameters according to the compensated display grayscale corresponding to the LED in the instant row; and controlling the LED in the instant row to display according to the driving parameters;

wherein the obtaining the compensated display grayscale corresponding to the LED in the instant row based on the display grayscale of the LED in the previous row, the display grayscale of the LED in the instant row, and the display grayscale compensation table comprises:

calculating a parasitic capacitance on the respective data line corresponding to the LED in the previous row based on the display grayscale of the LED in the previous row;

calculating a respective compensation value for the display grayscale of the LED in the instant row based on the parasitic capacitance obtained by the LED in the previous row and the display grayscale of the LED in the instant row; and obtaining the compensated display grayscale corresponding to the LED in the instant row based on the compensation value so as to generate the display grayscale compensation table.

2. The driving method as recited in claim 1, wherein the display device further comprises an LED current generation circuit; wherein each data line is correspondingly connected to a respective LED current generation circuit; wherein the LED current generation circuit comprises a data register, a digital-to-analog converter, and a control switch; wherein a gate terminal of the control switch is connected to the data register through the digital-to-analog converter, a source terminal of the control switch is connected to a reference low level, and a drain terminal of the control switch is configured to output an LED current, wherein the obtaining the corresponding driving parameters according to the compensated display grayscale corresponding to the LED in the instant row comprises:

obtaining corresponding voltage data according to a compensated display grayscale corresponding to the LED in the previous row; and storing the voltage data in the data register, and before the LED in the instant row is displayed, transmitting, by the data register, the stored voltage data to the digital-to-analog converter to generate a corresponding data voltage, and controlling the control switch to be turned on through the generated data voltage so as to generate and output the LED current.

3. The driving method as recited in claim 1, wherein the obtaining the compensated display grayscale corresponding to the LED in the instant row based on the display grayscale of the LED in the previous row, the display grayscale of the LED in the instant row, and the display grayscale compensation table comprises:

obtaining the compensated display grayscale corresponding to the LED in the instant row based on an original display grayscale of the LED in the previous row, an original a display grayscale of the LED in the instant row, and the display grayscale compensation table.

4. A driving method of a display device, the display device comprising a plurality of scan lines, a plurality of a data lines, and a plurality of LED lights driven by the plurality of scan lines and the plurality of data lines; wherein the plurality of LED lights are arranged in a plurality of rows and a plurality of columns; wherein an anode of each LED is connected to the respective scan line, and a cathode of each LED is connected to the respective data line; wherein the driving method comprises:

obtaining a compensated display grayscale corresponding to an LED in an instant row based on a display grayscale of an LED in a previous row, a display grayscale of the LED in the instant row, and a display grayscale compensation table;

obtaining corresponding driving parameters according to the compensated display grayscale corresponding to the LED in the instant row; and controlling the LED in the instant row to display according to the driving wherein the obtaining the compensated display grayscale corresponding to the LED in the instant row based on the display grayscale of the LED in the previous row, the display grayscale of the LED in the instant row, and the display grayscale compensation table comprises:

calculating a parasitic capacitance on the respective data line corresponding to an LED in a second previous row based on display grayscale of the LED in the second previous row;

calculating a compensation value for the display grayscale of the LED in the previous row based on the parasitic capacitance obtained by the LED in the second previous row and the display grayscale of the LED in the previous row so as to drive the LED in the previous row for display;

calculating a compensation value for the display grayscale of the LED in the instant row based on the parasitic capacitance obtained by the compensated LED in the previous row and the display grayscale of the LED in the instant row;

obtaining the compensated display grayscale corresponding to the LED in the instant row based on the compensation value for the display grayscale of the LED in the previous row and the compensation value for the display grayscale of the LED in the instant row, so as to generate the display grayscale compensation table.

5. The driving method as recited in claim 1, wherein let the parasitic capacitance be C1, a parasitic capacitance between the respective data line and a ground wire be C2, a parasitic capacitance between the respective data line and the respective scan line be C3, and a parasitic capacitance in the LED light be C4, then C1=C2+C3+C4.

6. The driving method as recited in claim 1, wherein the display grayscale is that of the respective data line, and wherein the driving method further comprises:

when the LED light stops emitting light, outputting no driving parameters on the respective data line, correspondingly reducing a voltage of a control terminal of a driving switch of the respective scan line to release the parasitic capacitance on the respective scan line.

7. The driving method as recited in claim 1, further comprising the following operations prior to the obtaining the compensated display grayscale corresponding to the LED in the instant row based on the display grayscale of the LED light in the previous row, the display grayscale of the LED light in the instant row, and the display grayscale compensation table:

determining whether the display grayscale of the LED light in the previous row and the display grayscale of the LED light in the instant row are each less than 64 grayscales;

in response to determining that the display grayscale of the LED light in the previous row and the display grayscale of the LED light in the instant row are each less than 64 grayscales, then turning to perform the obtaining the compensated display grayscale corresponding to the LED in the instant row based on the display grayscale of the LED light in the previous row, the display grayscale of the LED light in the instant row, and the display grayscale compensation table; and in response to determining that the display grayscale of the LED light in the previous row and the display grayscale of the LED light in the instant row are not less than 64 grayscales, obtaining the corresponding driving parameters according to the display grayscale corresponding to the LED in the instant row and accordingly controlling the LED in the instant row to display according to the corresponding driving parameters.

8. The driving method as recited in claim 1, wherein the calculating the parasitic capacitance corresponding to the LED in the previous row according to the display grayscale of the LED in the previous row comprises:

calculating the parasitic capacitance on the respective data line corresponding to the LED in the previous row based on the display grayscale of the LED in the previous row;

and wherein the calculating the respective compensation value for the display grayscale of the LED in the instant row based on the parasitic capacitance obtained from the LED in the previous row and the display grayscale of the LED in the instant row comprises:

calculating the respective compensation value for the display grayscale of the LED in the instant row based on the parasitic capacitance obtained on the respective data line corresponding to the LED in the previous row and the display grayscale of the LED in the instant row.

9. The driving method as recited in claim 2, wherein the storing the voltage data in the data register, and before the LED in the instant row is displayed, transmitting, by the data register, the stored voltage data to the digital-to-analog converter to generate a corresponding data voltage, and controlling the control switch to be turned on through the generated data voltage so as to generate and output the LED current comprises:

controlling the digital-to-analog converter to generate a corresponding data voltage based on different voltage data, and outputting the corresponding data voltage to the control terminal of the respective control switch, so as to control an conduction degree of the control switch and further control a magnitude of a driving current of the respective LED.

10. A display device, comprising a plurality of scan lines, a plurality of data lines, and a plurality of LED lights driven by the plurality of scan lines and the plurality of data lines; wherein the plurality of LED lights are arranged in a plurality of rows and a plurality of columns; wherein an anode of each LED is connected to the respective scan line, a cathode of each LED is connected to the respective data line; wherein the display device further comprises a storage module and a driving parameter generation module, wherein the storage module is used to store a display grayscale compensation table, the driving parameter generation module is configured to generate corresponding driving parameters based on a compensated display grayscale corresponding to an LED light in the instant row to control the LED lights of the display device to display;

wherein the display device is driven using a driving method comprising:

obtaining a compensated display grayscale corresponding to an LED in an instant row based on a display grayscale of an LED light in a previous row, a display grayscale of the LED light in the instant row, and a display grayscale compensation table;

obtaining corresponding driving parameters according to the compensated display grayscale corresponding to the LED in the instant row; and controlling the LED in the instant row to display according to the driving parameters;

wherein the obtaining the compensated display grayscale corresponding to the LED in the instant row based on the display grayscale of the LED light in the previous row, the display grayscale of the LED light in the instant row, and the display grayscale compensation table includes:

calculating a parasitic capacitance on the respective data line corresponding to the LED in the previous row based on the display grayscale of the LED in the previous row;

calculating a compensation value for the display grayscale of the LED in the instant row based on the parasitic capacitance obtained by the LED in the previous row and the display grayscale of the LED in the instant row; and obtaining the compensated display grayscale corresponding to the LED in the instant row based on the compensation value so as to generate the display grayscale compensation table.

11. The display device as recited in claim 10, wherein the display device comprises a data driving chip configured to output driving parameters to the plurality of data lines, wherein the obtaining the compensated display grayscale corresponding to the LED in the instant row based on the display grayscale of the LED in the previous row, the display grayscale of the LED in the instant row and the display grayscale compensation table comprises:

dividing the display device into a first display region and a second display region along a direction of each data line; and wherein when the LED light in the previous row and the LED light in the instant row are both located in the first display region, obtaining the compensated display grayscale corresponding to the LED in the instant row based on the display grayscale of the LED in the previous row, the display grayscale of the LED in the instant row, and a first display grayscale compensation table; when the LED light in the previous row and the LED light in the instant row are both located in the second display region, obtaining the compensated display grayscale corresponding to the LED in the instant row based on the display grayscale of the LED in the previous row, the display grayscale of the LED in the instant row, and a second display grayscale compensation table; and when the LED light in the previous row is located in the first display region and the LED light in the instant row is located in the second display region, obtaining the compensated display grayscale corresponding to the LED in the instant row based on the compensated display grayscale of the LED in the previous row, the display grayscale of the LED in the instant row, and the second display grayscale compensation table; and wherein when the display grayscale of the LED in the previous row and the display grayscale of the LED in the instant row in the first display region are respectively equal to the display grayscale of the LED in the previous row and the display grayscale of the LED in the instant row in the second display region, the compensated display grayscale corresponding to the first display grayscale compensation table is different than that corresponding to second display grayscale compensation table.

* * * * *